United States Patent

Shida et al.

[11] Patent Number: 5,433,479
[45] Date of Patent: Jul. 18, 1995

[54] VEHICLE STRUCTURE

[75] Inventors: Masato Shida, Fujisawa; Ryoichi Kawahara, Atsugi; Toshihiko Hayashi, Sagamihara, all of Japan

[73] Assignee: Nissan Motor Co., Ltd., Yokohama, Japan

[21] Appl. No.: 263,719

[22] Filed: Jun. 22, 1994

[30] Foreign Application Priority Data

Jul. 27, 1993 [JP] Japan ............................ 5-184636

[51] Int. Cl.⁶ ................................... B62D 7/22
[52] U.S. Cl. .......................... 280/788; 280/688; 280/690
[58] Field of Search ............ 280/788, 688, 690, 704, 280/673

[56] References Cited

U.S. PATENT DOCUMENTS 4,202,277  5/1980  Browne et al. ............ 105/215.2
4,955,292  9/1990  Cripe ............................ 105/4.2
5,137,297  8/1992  Walker ........................ 280/414.5

*Primary Examiner*—Kenneth R. Rice
*Attorney, Agent, or Firm*—Foley & Lardner

[57] ABSTRACT

An axle beam type rear suspension of an automotive vehicle having a pair of trailing arms located respectively at the right and left sides of a vehicle body. Each trailing arm is mounted through a bushing on a support shaft bridging inboard and outboard side brackets which are spaced from each other and fixed to a rear side member. The outboard side bracket extends downward over the lower end of a side sill fixedly secured to the rear side member. A parking brake cable is disposed between the trailing arm and the outboard side bracket and located at a position higher than the lower end of the outboard side bracket, thereby preventing the parking brake cable from interfering with an attachment of a vehicle lifting device when the vehicle is raised to make vehicle maintenance or repair.

10 Claims, 5 Drawing Sheets

VEHICLE STRUCTURE

BACKGROUND OF THE INVENTION

1. Field of the Invention

This invention relates to improvements in a structure or arrangement of an automotive vehicle in connection with a suspension, and more particularly to a vehicle structure by which a parking brake cable is prevented from interfering with an attachment of a vehicle lifting device or jack during a vehicle raising operation.

2. Description of the Prior Art

Automotive vehicles are equipped with a parking brake including a parking brake cable which is disposed under the floor of a vehicle body and extends to the central support section of a rear road wheel. The parking brake cable passes by a trailing arm of a rear suspension. It is assumed that the parking brake is located outboard of the trailing arm.

However, drawbacks have been encountered in such a conventional vehicle arrangement in which the parking brake cable is disposed outboard of the trailing arm. That is, when the vehicle body is raised by a lifting device or jack for the purpose of vehicle maintenance and repair, an attachment of the lifting device is first brought into contact with a jack-up point at the lower end of a side sill located near and outboard of the trailing arm, followed by raising the whole vehicle by the lifting device. At this time, if the attachment of the lifting device is unintentionally slightly shifted inboard with the attachment comes into interference with the parking brake cable. As a result, there is the possibility that the parking brake cable will be placed between the attachment and the trailing arm at a position where the trailing arm is securely supported.

SUMMARY OF THE INVENTION

It is an object of the present invention to provide an improved vehicle structure by which drawbacks encountered in conventional vehicle structures have been overcome without using any complicated device.

Another object of the present invention is to provide an improved vehicle structure by which a parking brake cable can be effectively prevented from interfering with a part of a vehicle lifting device when the vehicle is raised by the lifting device.

A further object of the present invention is to provide an improved vehicle structure by which a parking brake cable can be effectively prevented from being placed between a trailing arm and an attachment of a vehicle lifting device, when the vehicle is raised by the lifting device for the purpose of vehicle maintenance and repair.

A vehicle structure of the present invention comprises a side sill forming part of a vehicle body. A rear side member is fixedly disposed inboard of the side sill. A first bracket is fixedly disposed inboard of the rear side member. A second bracket is fixedly secured to the rear side member and spaced from the first bracket. The second bracket is located outboard of the first bracket and has a lower end that is located at a position lower in level than a lower end of the side sill. A support shaft connects the first and second brackets. A trailing arm is mounted through a bushing on the support shaft. A parking brake cable is disposed below the bushing and outboard of the trailing arm.

With this vehicle structure, by virtue of the fact the lower end of the outboard side bracket is located lower in level than that of the side sill, the attachment of a vehicle lifting device can be effectively prevented from interfering with the parking brake cable, even if, the attachment is unintentionally shifted further inboard during a raising operation for the vehicle, although the parking brake cable is disposed at the outboard side of the trailing arm. As a result, the parking brake cable is prevented from being placed between the attachment and the trailing arm.

DETAILED DESCRIPTION OF THE INVENTION

Figure 1:
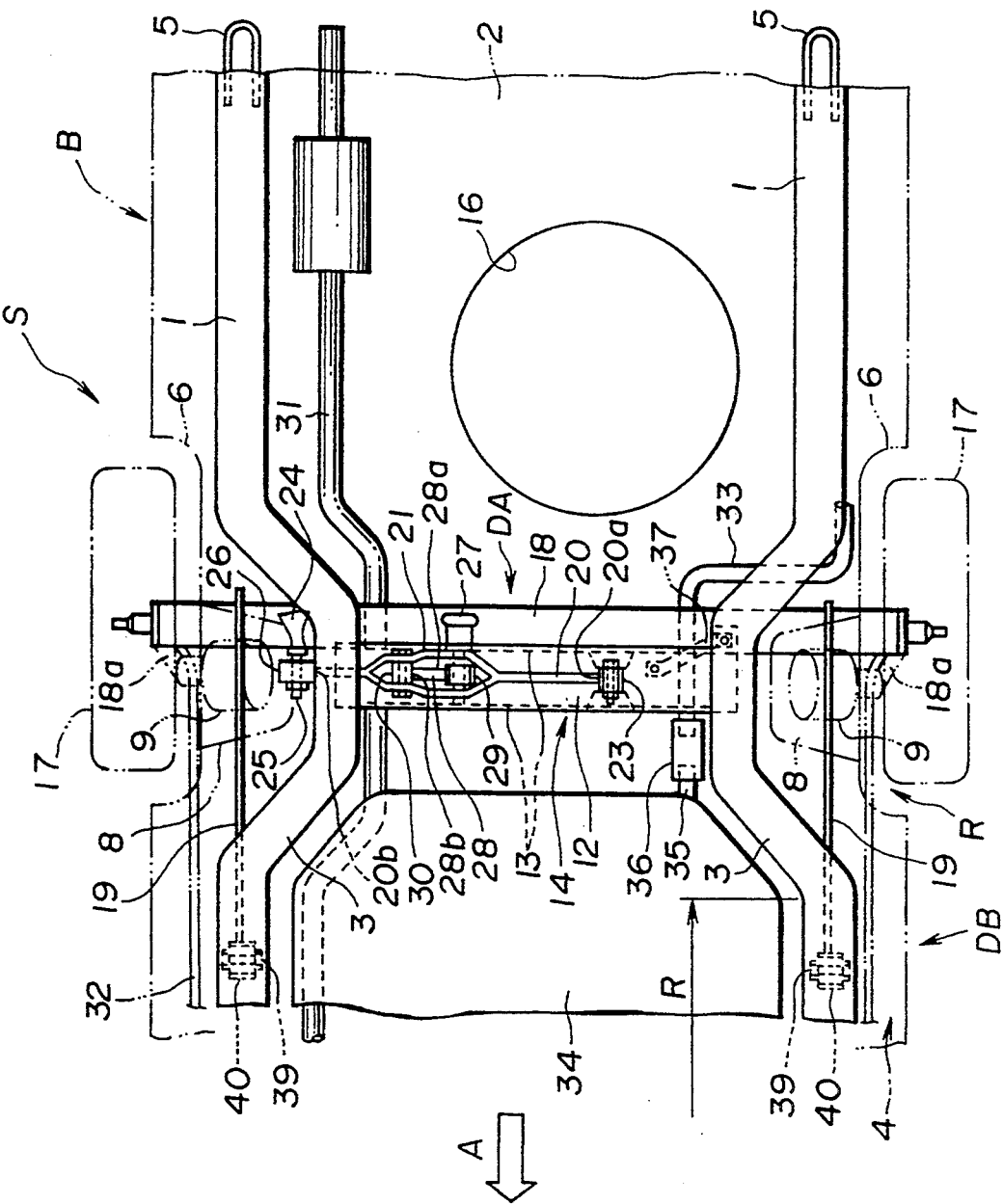
FIG. 1 is a fragmentary plan view of an embodiment of a vehicle structure in accordance with the present invention.
Figure 2:
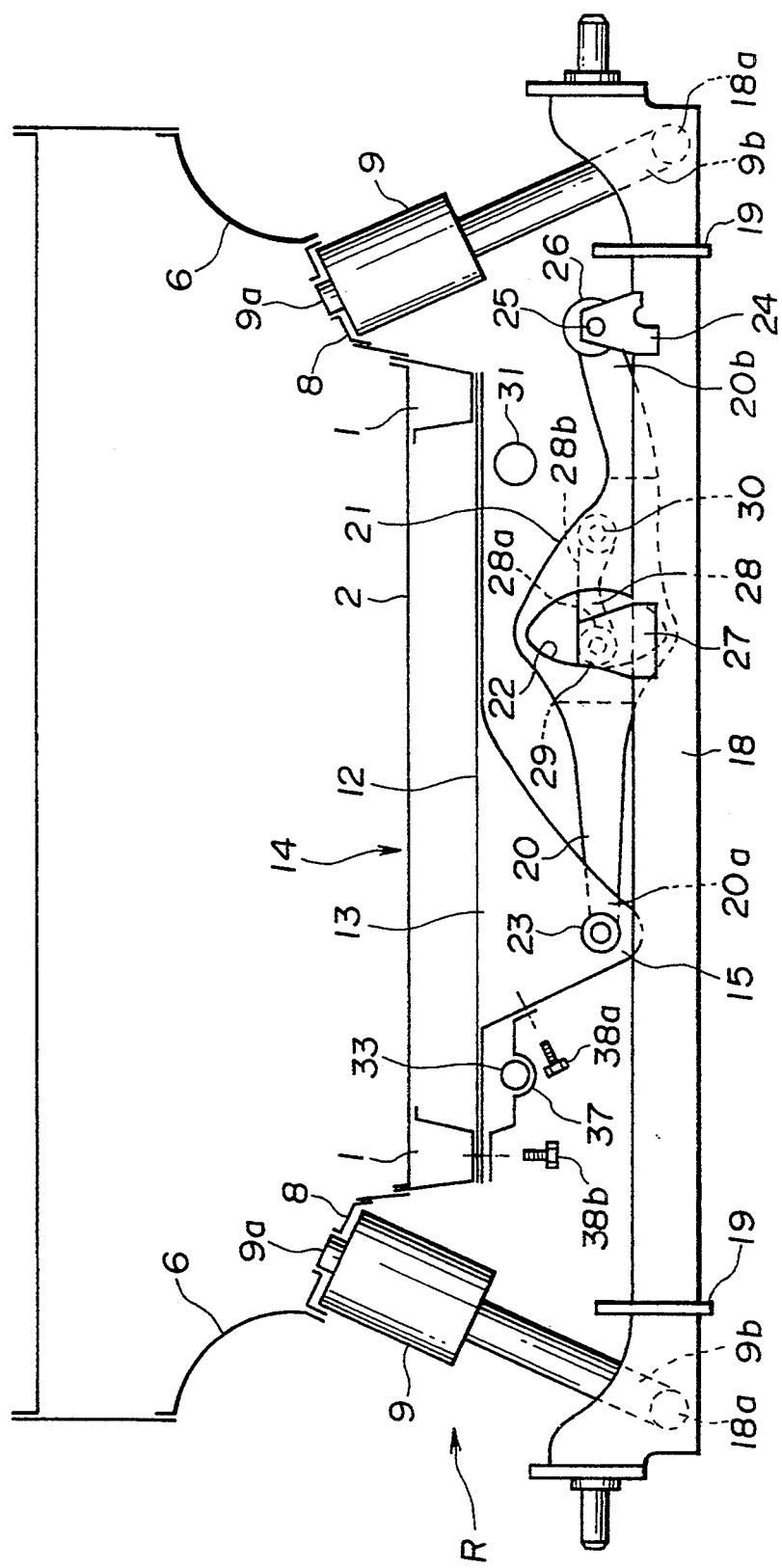
FIG. 2 is a schematic side view, partly in section, of the vehicle structure as viewed from the direction of an arrow DA in FIG. 1.

Referring now to FIGS. 1 to 5, a preferred embodiment of a vehicle structure according to the present invention is illustrated by the reference character S. The vehicle structure S in this embodiment is of an automotive vehicle and comprises an axle beam type rear suspension R. "Right" and "left" sides mentioned hereinafter are locations as viewed from the rear of the vehicle, as shown in FIG. 2, or the direction indicated by an arrow A in FIG. 1. The arrow A points in the forward direction of the vehicle structure.

The rear suspension R includes a pair of opposite rear side members 1, 1. The side members 1, 1 are, respectively, securely joined to the lower surface of a floor panel 2 at right and left opposite sides, and extend generally parallel and in a fore-and-aft direction of the body B of the automotive vehicle. The rear side members 1, 1 are, respectively, formed with bent sections 3, which are bent or projected inboard of the vehicle body B at their generally central section so that the both bent sections 3, 3 are closer to each other as compared with other sections of each rear side member 1, 1. Each rear side member 1 is provided, at its rear end, with a tie joint 5 to which a hook (not shown) for fixing the vehicle body B is to be hooked when the vehicle is transported.

The bent sections 3 of the right and left rear side members 1, 1 are connected with each other by a channel-like cross member 12 which has a generally ]-shaped cross-section and located to open upwardly. In other words, the cross member 12 has the opposite end sections which are, respectively, fixedly secured to the right and left rear side members 1, 1. A pair of Panhard rod brackets 13, 13 are respectively fixedly joined to front and rear side surfaces or walls of the cross member 12. Each Panhard rod bracket 13 has generally a profile of a reversed triangle. The cross member 12 and the Panhard rod brackets 13, 13 constitute a vehicle body member 14. The lower end section 15 of a Panhard rod bracket 13 is located slightly to the left, as viewed in FIG. 2, of a laterally central position of the vehicle body B, while at the same time being located at generally the same position as the center of a spare tire pan 16 in the lateral direction of the vehicle body B. The spare tire pan 16 is formed depressed in the floor panel 2 to house a spare tire (not shown).

An axle beam 18 is disposed on the rear side of the bent sections 3, 3 of the rear side members, as shown in FIG. 1 and extends in the lateral direction of the vehicle body B. The axle beam 18 is provided at its opposite ends with rear (road) wheels 17. The opposite end sections of the axle beam 18 are respectively connected to the rear side members 1 through trailing arms 19, 19. Each trailing arm 19 functions to support a force input from the rear wheel 17 in the fore-and-aft direction of the vehicle body B. Each of the opposite end sections of the axle beam 18 is provided with a projection 18a which projects forward. Shock absorber struts 9, 9 are generally provided between the axle beam 18 and the vehicle body member 14. Each strut 9 has a lower end 9b which is connected to the projection 18a. The upper end 9a of each strut is secured to the upper section of a strut housing 8 which is connected to the vehicle body member 14. More specifically, the upper end 9a of each strut 9 is located slightly inboard relative to the lower end 9b of the same to meet the requirements in performance of the suspension, so that the opposite struts 9, 9 are arranged to take generally the shape of sides of a trapezoid (formed by vehicle body member 14, axle beam 18, and the struts 9,9), as viewed from the rear of the vehicle body as shown in FIG. 2. Accordingly, the struts 9, 9 function to receive vertical force input applied from the rear wheels 17, 17.

A Panhard rod or track bar 20 is disposed generally horizontal to connect the vehicle body member 14 and the axle beam 18. The Panhard rod 20 is enlarged in vertical width only at its generally central section 21 which takes a double wall structure and includes front and rear walls (no numerals) as shown in FIG. 1. The rear wall of the double wall structure central section 21 is formed with a generally oval-shaped opening 22 which passes through it in the fore-and-aft direction. The Panhard rod 20 has a left end 20a as seen in FIG. 2, which is securely attached to the lower end sections of the Panhard rod brackets 13 through a bushing 23. The right end 20b of the Panhard rod 38, as shown in FIG. 2, is mounted on a support pin 25 of a bracket 24 securely disposed at the right side section of the axle beam 18, through an anisotropic bushing 26 serving as a vibration absorbing member. A bracket 27 is fixedly secured to the upper surface of the axle beam 18 at a location corresponding to the opening 22 of the Panhard rod 20. An assist link 28 is provided to connect the Panhard rod 20 and the axle beam 18. More specifically, the assist link 28a has a left end 28a which is securely attached to the bracket 27 through a bushing 29. The right end 28b of the assist link 28, as shown in FIG. 2, is securely attached to the double wall structure section 21 through a bushing 30, at a right side of the opening 22.

The vehicle structure S further comprises an exhaust pipe 31 through which exhaust gas is discharged out of an internal combustion engine (not shown). The exhaust pipe 31 extends along the right rear side member 1 as shown in FIG. 2, toward the rear of the vehicle. A parking brake cable 32, forming part of a parking brake for the vehicle, is disposed at the outboard side of the trailing arm 19 and is connected to the central supporting section (not shown) of the rear wheel 17. It will be understood that the Panhard rod 20 of this embodiment is formed short, and therefore the parking brake cable 32 can be thus disposed at the outboard side of the trailing arm 19. Although the parking brake cable 32 and the exhaust pipe 31 are close to each other at the right side section of the vehicle body, the parking brake cable 32 is protected from heat of the exhaust pipe 32 because the trailing arm 19 is interposed between them such that the trailing arm 19 serves as a heat insulation plate.

A filler tube 33 for fuel supply is connected through a connector hose 36 to an inlet pipe 35 of a fuel tank 34. The inlet pipe 35 is located at the left side portion of the rear end wall of the fuel tank 34. This filler tube 33 passes through the lower side of the vehicle body member 14 and extends to the outside of the vehicle body in a winding state. This filler tube 33 is fixed at a position near its end connected to the hose 36, by means of a bracket 37 in a manner to be supported from the lower side by the bracket 37. More specifically, the right end of this bracket 37 is fixed to the side surface of the Panhard rod bracket 13 by a bolt 38a, whereas, the left end of the bracket 37 is similarly fixed to the lower side wall of the left rear side member 1 together with the vehicle body member 14 by means of a bolt 38b. It will be understood that because the parking brake cable 32 is disposed at the outboard side of the trailing arm 19, as discussed above, the fuel tank 34 can be enlarged in lateral width by an amount corresponding to a distance to approach the trailing arm 19, thereby enabling the volume of the fuel tank larger.

Figure 3:
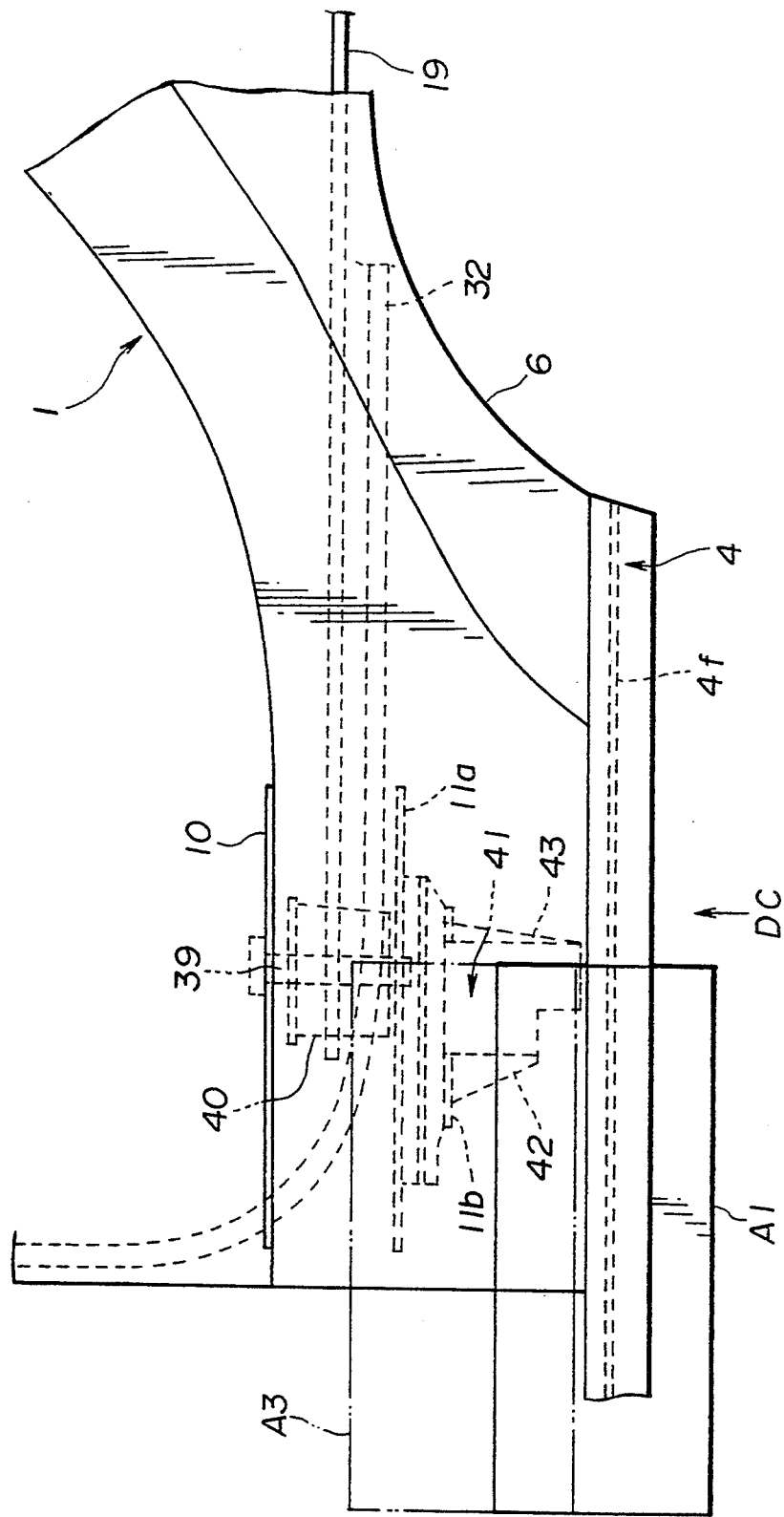
FIG. 3 is a fragmentary enlarged plan view of an essential part of the vehicle body as viewed from the direction of an arrow DB in FIG. 1.
Figure 4:
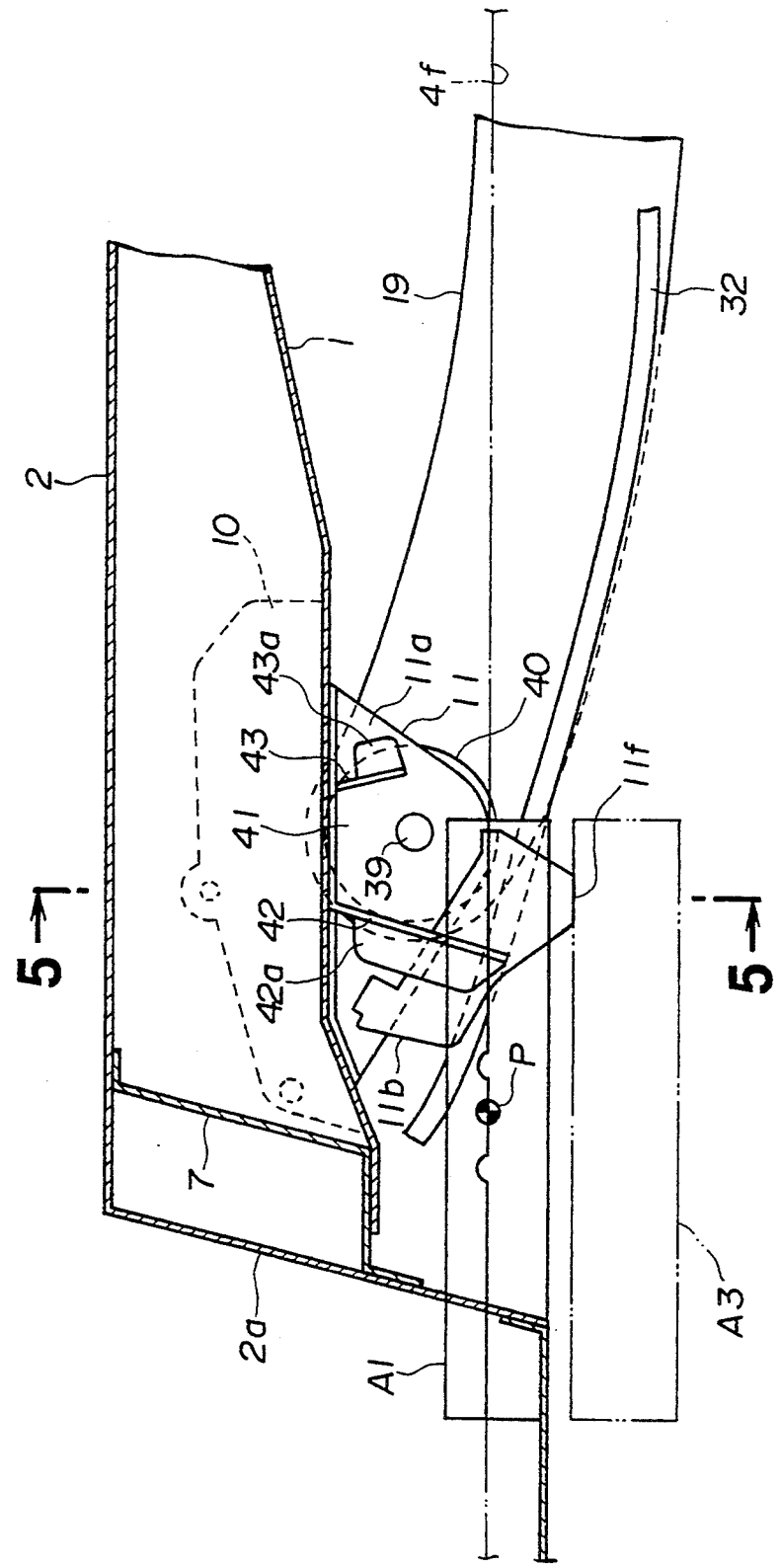
FIG. 4 is a fragmentary enlarged side view, partly in section, of the vehicle body as viewed from the direction of an arrow DC in FIG. 3.
Figure 5:
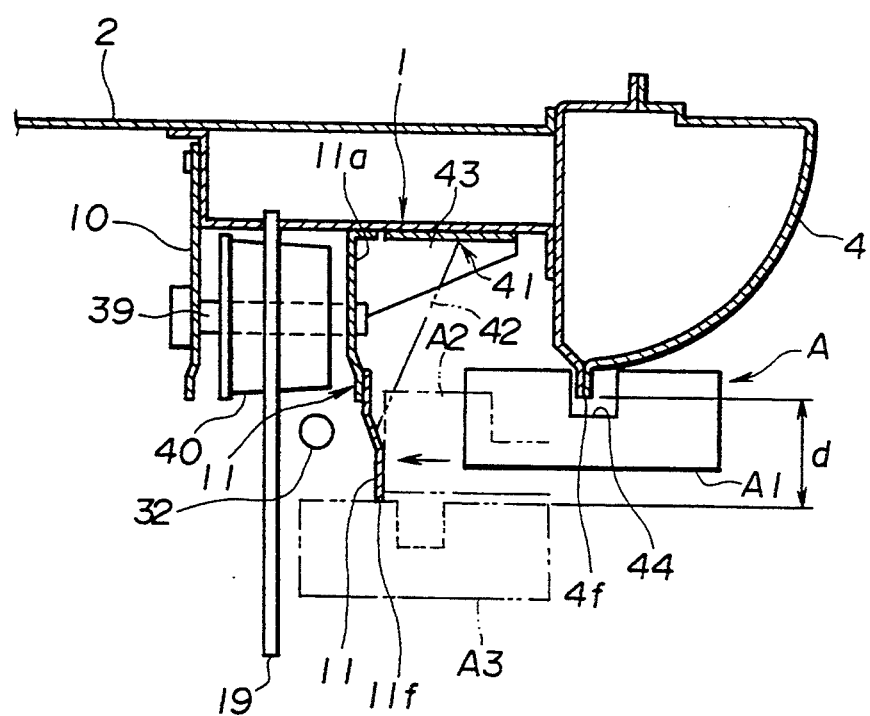
FIG. 5 is a cross-sectional view taken in the direction of arrows substantially along the line 5—5 of FIG. 4.

A further discussion is provided of the structure around the trailing arm 19 in a region R (in FIG. 1) front of a wheel house 6 in which the rear wheel 17 is housed, particularly with reference to FIGS. 3 to 5. For the purpose of simplicity of illustration, only the left side structure will be explained though the same structure is provided at the opposite right side of the vehicle body B.

A side sill 4 extends in the fore-and-aft direction of the vehicle body B on the front side of the wheel house 6 and has a closed cross-sectional shape as clearly shown in FIG. 5. The outside end of the floor panel 2 is fixedly joined to the inboard surface of the side sill 4. The rear side member 1 is fixedly secured to the floor panel 2. More specifically, the inboard side end portion of the rear side member 1 is fixedly joined to the floor panel 2 at the lower surface, whereas the outboard side end portion of the same is fixedly joined to the inboard side wall of the side sill 4. The front side of the floor panel 2 is formed into a downwardly inclined section 2a forming part of a step-like structure (no numeral). The cross member 7 extending in the vehicle width direction is fixedly joined to the rear side surface of the downwardly inclined section 2a of the floor panel 2.

An inboard side bracket 10 is fixedly jointed to the inboard side vertical wall of the rear side member 1, and extends vertically and in the fore-and-aft direction of the vehicle body B. An outboard side bracket 11 has a main body 11a which is fixedly joined to the central portion of the rear side member 1 at the lower surface. The outboard side bracket 11 includes an extension piece 11b which is fixedly connected to a lower end section of the outboard side bracket main body 11a so that the extension piece 11b and extends further downward that the main body 11. The extreme end 11f of the outboard side bracket 11 is located below by a distance d relative to the lower end 4f of the side sill 4 as illustrated in FIG. 5. The main body 11a and the extension piece 11b are generally parallel with each other. Additionally, the outboard side bracket 11 is generally parallel with the inboard side bracket 10.

A support shaft 39 is provided between the inboard side bracket 10 and the outboard side bracket main body 1 1 a in a manner to pass through the both 10, 11a. A bushing 40 is mounted on the support shaft 39. The front end of the above-mentioned trailing arm 19 is mounted on this support shaft 39 through the bushing 40. In this embodiment, the trailing arm 19 is in the shape of a plate, and extends vertically and in the fore-and-aft direction of the vehicle body B. The reference character P in FIG. 4 indicates a jack-up point at which a lifting force of a lifting device or jack (not shown) is to applied to the vehicle when the vehicle is lifted. The jack-up point P resides at the lower end 4f of the side sill 4 and is located slightly forward of the bushing 40. Additionally, the position of the extreme end of the lower end 11f of the outboard side bracket 11 generally corresponds to the position of the bushing 40 in the fore-and-aft direction of the vehicle body B.

A brace 41 is provided between the lower surface of the rear side member 1 and the outboard side surface of the outboard side bracket 11. The inboard side end of the brace 41 is fixedly joined to the outboard side surface of the bracket 11 whereas the upper end of the same is fixedly jointed to the lower surface of the rear side member 1. The brace 41 has a generally ]-shaped cross-section and opens downward, and has a front wall section 42 and a rear wall section 43 which are integral with an upper wall section (no numeral) joined to the rear side member 1. The front and rear wall sections 42, 43 are respectively formed at their inboard end with flanges 42a, 43a which are fixedly joined to the outboard surface of the outboard side bracket 11. The front wall section 42 is longer in a generally vertical direction than the rear wall section 43 and fixed throughout the outboard side bracket main body 11a and the extension piece 11b.

Next, advantageous effects of the above-discussed embodiment will be discussed.

Locational Relationship between the Vehicle Structure and an Attachment of a Vehicle Lifting Device The reference character A in FIGS. 3 to 5 designates an attachment of the vehicle lifting device or jack. The attachment has a groove 44 which is formed along its length and located at the central portion of the upper surface thereof. This attachment A is set at a normal position A1 at which the central portion of the groove 44 in the fore-and-aft direction is brought into contact with the jack-up point P from the lower side, so that the whole vehicle will be raised upwardly as it is lifted by the lifting device.

During the raising operation of the vehicle, it may occur that the groove 44 of this attachment A at the position A1 does not meet the lower end (or edge-like portion) 4f, and thus the attachment A shifts to the inboard side to take a position A2 under a failed operation of the lifting device. However, even if the attachment A at the position A1 is shifted to the inboard side at position A2, the inboard-shifted attachment comes into contact with the lower end portion 11f of the outboard side bracket 11, and is prevented from further moving to the inboard side because the lower end portion 11f of the outboard side bracket is located below or lower than the lower end 4f of the side sill 4. Consequently, any problem due to interference between the attachment A and the parking brake cable 32 will not arise.

Additionally, situation seem to arise such that the attachment A at the position A1 gets below the outboard side bracket 11, and shifts inboard side thereby to take a position A3. However, even in such a case, the attachment A at the position A3 comes into contact with the end edge of the lower end portion 11f of the outboard side bracket 11 in the course of raising of the attachment A. With this arrangement attachment A is prevented from further rising because the lower end portion 11f of the outboard side bracket 11 is located below the parking brake cable 32. Consequently, the parking brake cable 32 is prevented from being placed between the attachment A at the position A3 and the bushing 40. In case that the attachment, at the position A3, shifts rearward in addition to its large shift to the inboard side as mentioned above, it may seem that there is the possibility of the rear end portion of the upper surface of the attachment A partly interfering with the rear side portion of the parking brake cable 32; however, in fact, the bushing 40 does not exist at this location and therefore the attachment A merely contacts the parking brake cable 32, so that no baneful influence is applied to the parking brake cable 32.

While only an example using the attachment A, in position A1 to A3, in a state extending in the fore-and-aft direction of the vehicle body has been shown and described, it will be understood that attachment A may be used in a state extending in the lateral direction of the vehicle body, in which the interface between the attachment A can be avoided.

Local Rigidity Around a Position at which the Trailing Arm is Supported

The brace 41 is fixedly jointed to the outboard side surface of the outboard side bracket 11, in which the front wall section 42 of the brace 41 is joined to the outboard side bracket 11 in a state to reach the extension piece 11b. This brace 41 increases a local rigidity at a location around the support shaft 39. Accordingly, a support rigidity of the trailing arm 19 is increased thereby improving a driving stability of the vehicle.

Performance of the Suspension

In the suspension of this embodiment, the assist link 28 is provided in the double wall structure section 21 located at the generally central section of the Panhard rod 20, and therefore a one point support manner is taken on the side of the vehicle body member 14, whereas, a two point support manner is taken on the side of the axle beam 18 in the suspension. Additionally, the anisotropic bushing 26 for absorbing a lateral displacement is disposed at the right end 20b of the Panhard rod 20. As a result, the displacement per second of the vehicle body member 14 in the lateral direction of the vehicle body can be suppressed to a small level, the displacement being controlled by a force input from a load surface. Furthermore, by virtue of the fact that the structure of the Panhard rod 20 has a one point support manner on the side of the vehicle body member 14, and the two point support manner on the side of the axle beam 18, a suitable locational relationship of the axle beam 18 is maintained relative to the vehicle body, thus suppressing the change in scuffing to the road surface to a small level regardless of the vehicle body posture upon setting the axle beam 18 (or the road surface) as a standard. Accordingly, the amount of scuffing during bound and rebound of the road wheel on the road surface is suppressed at a small level regardless of presence or absence of a vehicle body roll. Additionally, when the rear wheel 17 makes its bound or rebound in a vehicle body roll state, no link arrangement change is made even under the vehicle roll state and even if a lateral direction force is applied to a road contacting point of the rear wheel 17. This prevents the development of a jack-up force which acts to raise the vehicle body member 14 from the left end 20a of the Panhard rod 20 under the action of a vertical component of a force of the Panhard rod 20.

Moreover, a part of the vehicle body member 14, to which the Panhard rod 20 is installed is in the shape of the reversed triangle such that it is sufficiently large in width at its base section secured to the cross member 12. As a result, a force input from the Panhard rod 20 can be effectively transmitted to the rear side member 1. Additionally, the lower end 9b of the strut 9 is attached to the position at the outboard side of the trailing arm 19, and therefore the distance between the right and left lower ends 9b are set large. This can realize a stable vehicle running with a small behavior change during the vehicle body roll.

While the vehicle body member 14 has been shown and described as being constituted by combining two members, i.e., the cross-member 12 and the Panhard rod bracket 13, it will be appreciated that an integral member which has been previously prepared by integrally fabricating the cross-member and the Panhard rod bracket may be employed in place of the vehicle body member 14. Further, the vehicle body member 14 may consist of only the Panhard rod bracket 13 without the cross-member 12 if it is disposed between the rear side members 1, 1.

What is claimed is:

1. A vehicle structure comprising:
   a side sill forming part of a vehicle body;
   a rear side member fixedly disposed inboard of said side sill;
   a first bracket fixedly secured to said rear side member;
   a second bracket fixedly secured to said rear side member and spaced from said first bracket, said second bracket being located outboard of said first bracket and having a lower end which is located at a position lower in level than a lower end of said side sill;
   a support shaft connecting said first and second brackets;
   a trailing arm mounted through a bushing on said support shaft; and
   a parking brake cable disposed below said bushing and outboard of said trailing arm.

2. A vehicle structure as claimed in claim 1, wherein said parking brake cable is disposed between said trailing arm and said second bracket.

3. A vehicle structure as claimed in claim 1, wherein position of the lower end of said second bracket generally corresponds to that of the said bushing in a fore-and-aft direction of the vehicle body.

4. A vehicle structure as claimed in claim 1, further comprising a brace disposed between said rear side member and said second bracket, said brace having a generally ]-shaped cross-section and including a first wall section fixedly secured to said rear side member, a second wall section fixedly secured to said second bracket, and a third wall section fixedly secured to said second bracket, said first wall section being integral with said second and third wall sections.

5. A vehicle structure as claimed in claim 1, further comprising a vehicle body member forming part of the vehicle body and joined with said rear side member, said vehicle body member extending in a lateral direction of the vehicle body and having a bracket extending downward, an axle beam spaced from and extending parallel with said vehicle body member, a Panhard rod extending generally parallel with said axle beam and having a first end securely connected to the bracket of said vehicle body member and a second end securely connected to said axle beam, and an assist link having a first end securely connected to said axle beam and a second end securely connected to said Panhard rod.

6. A vehicle structure as claimed in claim 5, further comprising an unisotropic bushing through which said Panhard rod second end and said axle beam are connected.

7. A vehicle structure as claimed in claim 5, further comprising first and second shock absorber struts which are spaced from each other and disposed between said vehicle body member and said axle beam, each shock absorber strut having a first end connected to said vehicle body member and a second end connected to said axle beam.

8. A vehicle structure as claimed in claim 1, further comprising an exhaust pipe disposed inboard of said trailing arm.

9. A vehicle structure as claimed in claim 1, wherein said parking brake cable is located at a position higher than the lower end of said second bracket in a region between the trailing arm and said second bracket.

10. A vehicle structure as claimed in claim 1, wherein said first and second brackets are generally parallel with each other and extend downwardly.

* * * * *